United States Patent Office 3,390,115
Patented June 25, 1968

3,390,115
POLYVINYL CHLORIDE ADHESIVE
COMPOSITIONS
Hugh J. Hagemeyer, Jr., William J. Gammans, and Alfred G. Robinson III, Longview, Tex., assignors to Eastman Kodak Company, Rochester, N.Y., a corporation of New Jersey
No Drawing. Filed Dec. 29, 1964, Ser. No. 422,003
2 Claims. (Cl. 260—31.6)

This invention relates to new compositions of matter and their preparation. In particular, the present invention concerns polyvinyl chloride (PVC) plastisols (and organosols) containing methacrylate esters of 2,2,4-trimethyl-1,3-pentanediol (TMPD) or 2,2-dimethyl-1,3-propanediol (NPG).

The fabrication of the useful objects such as toys, floor mats, gaskets, and the like from PVC plastisols is extensively practiced. The use of this technology in the manufacture of products from polyvinyl chloride has grown for the reasons that in contrast to equipment required for extrusion or injection molding, that required to process vinyl plastisols is relatively simple and inexpensive and that vinyl plastisols can be fabricated into useful objects by a variety of inexpensive techniques, such as rotational casting, slush molding, dip and spray coating.

Application of plastisol technology is limited, however, in two areas: first, vinyl plastisols in general have poor metal adhesion and cannot be commercially used directly as metal coatings; and second, since plastisols have a high, from about 30 to about 60% plasticizer concentration, the final fabricated articles are relatively soft and flexible.

Objects of the present invention therefore are: to provide PVC plastisols having improved adhesion to various substrates, and particularly to metal; to provide PVC plastisols giving products of improved rigidity and toughness; and to provide a commercially practicable process for preparing such plastisols.

These and other objects hereinafter becoming apparent have been achieved in accordance with the present invention through the discovery that the incorporation of at least one material selected from the group consisting of the mono- and dimethacrylate esters of TMPD and NPG into PVC plastisols overcomes both of the above limitations. Plastisols containing these esters can be used to coat metallic surfaces, especially steel. The resulting coatings show excellent metal adhesion and the compositions can be formulated into pastes and used to bond metallic substrates such as steel. Shear strengths of the cured adhesives are unexpectedly high and are in the 1500–2500 p.s.i. range. The resulting molded products exhibit greatly improved rigidity.

Among the advantages of using these methacrylate esters rather than other methacrylate esters, for example, of ethylene, propylene or butylene glycol are that plastisols containing the methacrylates of TMPD or NPG have superior viscosity stability and, after curing, have superior odor and color, and that the methacrylates of TMPD and NPG are less volatile than the common glycol methacrylate esters, resulting in less material loss during molding operations and more consistent film properties on aging. In the present compositions, conventional vinyl plasticizers, monomeric and polymeric, may be used to obtain a balance of properties most suitable for a specific end-use application.

In order to more clearly illustrate the variety of plasticizers useful in practicing the present invention, the following discussion is thought to be in order. Plasticizers may be defined as high boiling organic liquids or low melting solids which are added to an otherwise hard or tough resin to impart flexibility thereto. In the simplest terms, the main difference between ordinary solvents and plasticizers is volatility, which in the case of plasticizers, is quite low. The plasticizer's softening action (plasticization) is usually attributed to its ability to reduce the intermolecular attractive forces of the polymeric system. This plasticizing action may be theorized in either of the following ways:

(1) The attractive forces between the resin molecules are reduced by neutralization of the charges of the molecules by the plasticizer. In other words, the polymer molecules are "tied-up" and are no longer available to attract adjacent molecules. When these attractions between polymer and plasticizer are strong, a true solvent action occurs and the plasticizer is called a "solvent type"; and (2) The plasticizer forces the polymer molecules apart. Thus, distance alone is used to soften the polymer. In this instance, the physical attraction is obtained by sheer force. If the attraction between the polymer and plasticizer is negligible, the plasticizer is called a non-solvent type and the plasticizer functions merely as a spacer. Because the plasticizer is inserted and placed in position under heat (fusion), the molecular forces of the polymer exert a force upon the plasticizer when the compound returns to room temperature equilibrium, and in many cases, the non-polar plasticizer will be forced out. This condition is known as expudation or "spew."

Plasticizers may be structurally classified either as monomeric or polymeric, and functionally, they may be classified as primary and secondary. Monomeric plasticizers are simple monoesters or diesters of monobasic and dibasic acids or alcohols. Polymerics are complex polyesters of dibasic acids and dihydric alcohols having much higher molecular weights than monomerics, ranging from about 800 to 7,000.

Primary plasticizers are compounds that can be used as the sole plasticizer. The most common types are the phthalates, the phosphates, dibasic acid esters, and polymeric plasticizers. DOP (di-2-ethylhexyl phthalate) is the most widely used general purpose plasticizer. Such general purpose plasticizers provide an even balance of compound properties after fusion and are suited for plastisols because of the good flow properties provided. The most efficient plasticizers for vinyls are dibasic acid esters which provide maximum flexibility over a wide temperature range and also impart good flow properties to plastisols. Phosphate plasticizers are used primarily to impart flame retardant and chemical resistant properties to vinyl formulations. Polymeric polyesters and relatively high-molecular-weight monomeric plasticizers are used as primary plasticizers in applications requiring maximum permanence because of their resistance to migration, extraction, and volatilization. Satisfactory plastisol viscosity is obtained by using combinations of polymeric and general purpose plasticizers.

Secondary plasticizers are used in vinyl formulations to lower compound cost and to obtain specific compound properties. The type and amount of secondary used in any formulation is limited by the side effects on compound properties such as physical properties, color, stability, extractability and volatility. The chlorinated types are used for chemical and flame resistance, the epoxy type for light and heat stability, and the extender type for lower compound cost. The polymeric type epoxy plasticizers improve heat and light stability. Monomeric epoxy plasticizers are slightly less effective heat stabilizers but provide low temperature flex. The following Table I contains a listing of a number of useful plasticizers and the outstanding characteristic imparted to vinyl plastics thereby.

TABLE I

CHEMICAL COMPOSITION AND OUTSTANDING CHARACTERISTICS OF PLASTICIZERS

| Monomeric type: | Outstanding characteric |
|---|---|
| DOP (di - (2-ethylhexyl) phthalate) | General purpose. |
| DIOP (di(2 - ethyl-4-methylpentyl) phthalate) | Do. |
| DCP (di-capryl phthalate) | Do. |
| DIDP (di-isodecyl phthalate) | Volatility. |
| Di - (2 - ethylhexyl) hexahydrophthalate) | General purpose. |
| Cresyl diphenyl phosphate | Voatility, flame resistance. |
| TCP (tricresyl phosphate) | Do. |
| DOA di-(ethylhexyl) adipate) | Low temp. |
| DOS (di - (2 - ethylhexyl) sebacate) | Low temp. light stability. |
| DOZ di-(2-ethylhexyl) azelate) | Low temp. |
| Monomeric epoxy (2-ethylhexylepoxyltallate) | Heat and light stability, low temp. |
| Triethylene glycol dicaprylate | Heat stability, high thixotropy. |
| Acetyl tributyl citrate | Non-toxicity. |
| Polymeric type: | |
| Polyester of NPG and adipic acid (MW=1,200–1,300) | Permanence. |
| Epoxidized soy bean oil (MW approx. 1000) | Heat and light stability. |
| Polyester of TMPD and adipic acid terminated with the monoisobuytrate of TMPD (MW=800–1000) | Permanence. |
| Extender Type: | |
| Chlorinated resinous paraffin (volatile liquids to solids) | Chemical resistance. |
| Liquid aromatic hydrocarbon mixtures (MW=100–800) | Viscosity improver. |
| High boiling (above about 200° C.) liquid mixture of partially hydrogenated terphenyls | Do. |
| Iso-octyl palmitate | Viscosity and light stability. |

In general, as the ratio of methacrylate ester to plasticizer is increased, the hardness, stiffness and adhesives properties of the plastisol are increased. The ratio of methacrylate ester to either a plasticizer or to the ployvinyl chloride is not critical and can be varied over a wide range. Methacrylate ester to plasticizer ratios of from 1/5 to 5/1 are useful, with, for example, the upper end of the methacrylate range finding specific applications for rigid adhesives, and the lower end being suitable for high shock absorbing adhesives. The total amount of plasticizer plus methacrylate etser which may be employed is also variable between wide limits with between 40 to 80 parts per 100 parts (phr.) of PVC being preferred. It is preferred to use about a 3/1 ratio of the dimethacrylate to the monomethacrylate, but a 1/1 to 9/1 range has significant utility.

It is noted that the usual fillers, extenders, pigments and other such additives may be employed in the customary manner with the present plastisols. The methacrylate esters are prepared by conventional methods. Either direct esterification of the TMPD with methacrylic acid, or alcoholysis reactions with lower methacrylate esters such as methyl methacrylate can be used. An example of the preparation of a useful mixture of the mono- and dimethacrylates of TMPD is as follows:

Example 1.—A mixture consisting of 146 grams (1 mole) of TMPD, 500 grams (5 moles) of methyl methacrylate, and 3 grams (0.6 percent, based on methyl methacrylate) of hydroquinone was charged to a one-liter flask fitted with a pressure-equalizing dropping funnel, a thermometer, and a capillary tube for the introduction of air. The funnel was charged with a 2.0 N solution of sodium methoxide in methanol and the apparatus attached to a 10-tray Oldershaw column fitted with a variable-reflux head. The mixture was heated to 60° C. under a pressure of 200 mm., and 10 ml. of the sodium methoxide solution was introduced. When the vapors at the head of the column reached 34° C. (the boiling point of the methanol-methyl methacrylate azeotrope at 200 mm.), the head was adjusted for 50 percent take-off. Catalyst solution was added in small amounts to the reaction mixture during the entire six-hour reaction period until 30 ml. had been added. The base temperature ranged from 55–70° C., and the head temperature remained constant at 34° C. The reaction mixture was then neutralized with dilute acetic and washed with water and a saturated salt solution. The excess methyl methacrylate was flashed at reduced pressure, and after adding hydroquinnone (3 percent) the residue was distilled to give 133 grams of the monomethacrylate of TMPD and 113 grams of the dimethacrylate ester. It is noted that the monomethacrylate exists in the isomeric 1 and 3 forms in approximately a 1/1 ratio. While separation of these isomers is extremely difficult, small samples for analytical purposes can be obtained by well known gas chromatographic techniques.

The identifying characteristics of these esters are as follows:

| | 2,2,4-trimethyl-1, 3-pentanediol monomethacrylate | 2,2,4-trimethyl-1, 3-pentanediol dimethacrylate |
|---|---|---|
| Boiling Point, ° C. mm | 80–82/0.6 | 100–101/0.6 |
| Specific Gravity, 20°/20° | 0.9727 | 0.9893 |
| Refractive Index, $n^{25°}_D$ | 1.45595 | 1.45908 |
| Saponification Equivalent | [1] 211 | [2] 140 |

[1] Theor. 214.
[2] Theor. 141.

The preparation of methacrylate esters of 2,2-dimethyl-1,3-propanediol is carried out using either conventional ester interchange or direct esterification reaction conditions. In the ester interchange process, 2,2-dimethyl-1,3-propanediol is reacted with methyl methacrylate using either acidic or basic catalysts at concentrations of 0.5 to 5 percent. The reaction temperature can be controlled by the combined or separate use of reduced pressures, the use of an inert diluent or an excess of methyl methacrylate. Methanol is removed as formed. After catalyst removal, the pure methacrylate esters of 2,2-dimethyl-1,3-propanediol are isolated by distillation at reduced pressure. Alternatively, 2,2-dimethyl-1,3-propanediol may be esterified with methacrylic acid using an acidic catalyst. In either process, a stabilizer such as hydroquinone may be used to inhibit polymerization. The following examples will illustrate the preparations.

Example 2.—A mixture consisting of 104 grams (1 mole) of 2,2-dimethyl-1,3-propanediol, 500 grams (5 moles) of methyl methacrylate, and 3 grams (0.6 percent, based on methyl methacrylate) of hydroquinone was charged to a one-liter flask fitted with a pressure-equalizing dropping funnel, a thermometer, and a capillary tube for the introduction of air. The funnel was charged with a 2.0 N solution of sodium methoxide in methanol and the apparatus attached to a 10-tray Oldershaw column fitted with a variable-reflux head. The mixture was heated to 60° C. under a pressure of 200 mm., and 10 ml. of the sodium methoxide solution was introduced. When the vapors at the head of the column reached 34° C. (the boiling point of the methanol-methyl methacrylate azeotrope at 200 mm.), the head was adjusted for 50 percent take-off. Catalyst solution was added in small amounts to the reaction mixture during the entire six-hour reaction period until 30 ml. had been added. The base temperature ranged from 55–70° C., and the head temperature remained constant at 34° C. The reaction mixture was neutralized with dilute acetic acid and washed with water and a saturated salt solution. The excess methyl methacrylate was flashed at reduced pressure, and after adding hydroquinone (3 percent) the residue was distilled to give 116 grams of the monomethacrylate of 2,2-dimethyl-1,3-propanediol and 93 grams of the corresponding dimethacrylate ester. The following physical properties were obtained for these compounds:

|  | 2,2,4-trimethyl-1,3-pentanediol monomethacrylate | 2,2,4-trimethyl-1,3-pentanediol dimethacrylate |
| --- | --- | --- |
| Boiling Point, °C./mm. | 68/4 | 87/0.6 |
| Specific Gravity, 20°/20° | 0.9959 | 1.003 |
| Refractive Index, $n_D^{25°}$ | 1.44953 | 1.45128 |
| Saponification Equivalent | [1] 171 | [2] 121 |

[1] Theor. 172.
[2] Theor. 120.

Example 3.—To a one-liter, round-bottom flask equipped with a stirrer, Dean & Stark trap, reflux condenser, and thermometer were added 104 grams (1 mole) of 2,2-dimethyl-1,3-propanediol, 206 grams (2.4 moles) of methacrylic acid, 10 grams of p-toluenesulfonic acid, 200 ml. of benzene, and 0.3 gram of hydroquinone. The mixture was stirred at reflux for eight hours when the theoretical amount of water (36 grams) was obtained. The mixture was neutralized using 5 percent aqueous sodium bicarbonate, washed with water until neutral, and then dried. Hydroquinone (3 grams) was added to the crude product. Benzene was removed by flash distillation. The organic residue was then distilled through a 10-plate Oldershaw column to give 226 grams (94 percent conversion) to the dimethacrylate of 2,2-dimethyl-1,3-propanediol, B.P. 87° C. at 0.6 mm.

The PVC resins to which the present invention is particularly applicable are those of high molecular weights prepared by emulsion polymerization and are usually referred to as "dispersion grade" resins, and may be characterized as white powders having particles of from about 1 to about 3 microns, a specific gravity of about 1.4 g./cc., a bulk density of about 16 to 21 lbs./ft.$^3$, and a specific viscosity of about 0.5. The present invention is also applicable, however, to other PVC resins which are not formed by emulsion polymerization and which are blendable with the present esters and other ingredients by milling, Banburying, calendering, extrusion and the like techniques. The fluidized bed type of PVC resin is also useful herein. It is noted that where lower viscosity of the PVC is required, small amounts (up to about 10–15%) of volatile diluent may be employed and the system is then termed an organosol which has a pasty consistency for ease of forming. Where the diluent is absent, the system is termed a plastisol and is not as readily applied by such techniques as knife coating, dipping, or spraying, but rather by calendering and molding.

The mixtures of polyvinyl chloride and the TMPD or NPG methacrylates are prepared by conventional plastisol compounding techniques. The final coatings, castings, or adhesives are cured by heating at 115–185° C. for periods ranging from 0.10 to 4.0 hours. We prefer to use a curing temperature range of 135–150° C. for a period ranging from 0.25 to 2.0 hours. To achieve more rapid cure rates a free-radical catalyst such as di-t-butyl peroxide or t-butyl perbenzoate can be used in concentration of 0.1 to 5.0 percent.

The following examples will further illustrate the plastisols of the invention.

Example 4.—To a mixture consisting of 500 grams of a dispersion-grade polyvinyl chloride and 50 grams of lead carbonate stabilizer was added with stirring 250 grams of the TMPD methacrylates. The ratio of diester to monoester was 3:1. Di-2-ethylhexyl o-phthalate (125 grams) was then blended into the mixture. To the resulting plastisol was added one percent of t-butyl perbenzoate. The resulting paste was then applied to two 4-inch x ½-inch x 1/16-inch pieces of steel. An overlap of ½ inch was coated with the adhesive and held with clamps during the curing process of one hour at 150° C. The load necessary to break the samples was determined on an Instron Tensile Tester using an extension rate of 0.2 inch per minute. The tensile shear values so obtained were used as a measure of bond strengths. The average of five such determinations was 2200 p.s.i.

Example 5.—The plastisol preparation described in Example 4 was repeated with varying amounts of plasticizer (dioctyl phthalate) and the TMPD methacrylates (3:1 diester to monoester). The resulting physical properties are shown in the following table:

PHYSICAL PROPERTIES OF VARIOUS PLASTISOLS

| Dispersion Grade PVC, parts | 100 | 100 | 100 | 100 |
| --- | --- | --- | --- | --- |
| TMPD Methacrylates, parts | 60 | 50 | 40 | 30 |
| Di-2-ethylhexyl o-phthalate, parts |  | 10 | 20 | 30 |
| Heat Distortion Temperature, °F | 142 | 108 | 81 | 63 |
| Hardness, Shore | D75 | D70 | D55 | D35 |
| Tensile Strength, p.s.i. | 5,200 | 4,390 | 3,600 | 2,900 |
| Toughness, p.s.i. | 2,300 | 5,100 | 5,000 | 4,700 |

Example 6.—The plastisol preparation described in Example 4 was repeated except that varying amounts of plasticizer (DOP) and NPG methacrylates (5:1 diester to monoester) were used. The resulting physical properties are reported in the following table:

PLASTISOL PHYSICAL PROPERTIES

| NPG Methacrylates, phr | 60 | 50 | 40 | 30 |
| --- | --- | --- | --- | --- |
| Di-2-ethylhexyl o-phthalate, phr |  | 10 | 20 | 30 |
| Heat Distortion Temperature, °F | 157 | 113 | 95 | 81 |
| Hardness, Shore | D85 | D75 | D60 | D35 |
| Tensile Strength, p.s.i. | 5,800 | 4,800 | 3,850 | 3,400 |
| Toughness, p.s.i. | 1,850 | 4,750 | 4,450 | 4,000 |

The invention has been described in detail with particular reference to preferred embodiments thereof, but it will be understood that variations and modifications can be effected within the spirit and scope of the invention described hereinabove and in the appended claims.

We claim:

1. The process for obtaining an exceptionally strong bond comprising contacting the surfaces to be bonded with a composition of matter comprising a mixture of polyvinyl chloride, a plasticizer therefor, and at least one ester selected from the group consisting of the mono- and di-methacrylate esters of 2,2,4-trimethyl-1,3-pentanediol and 2,2-dimethyl-1,3-propanediol, the total amount of said ester and plasticizer comprising from about 40 to about 80 parts/100 parts of said polyvinyl chloride, and thereafter heating the mixture until a cure is obtained.

2. The process for obtaining an exceptionally strong bond comprising contacting the surfaces to be bonded with a composition of matter comprising a free radical catalyzed mixture of polyvinyl chloride, a plasticizer therefor and at least one material selected from the group consisting of the mono- and di-methacrylate esters of 2,2,4-trimethyl-1,3-propanediol, the total amount of said material and plasticizer comprising from about 40 to 80 parts/100 parts of said polyvinyl chloride, and thereafter heating the mixture until a cure is obtained.

(References on following page)

References Cited

UNITED STATES PATENTS

| | | | |
|---|---|---|---|
| 2,744,877 | 5/1956 | Smith | 260—31.6 |
| 3,160,599 | 12/1964 | Scullin | 260—31.6 |
| 3,247,289 | 4/1966 | Sears | 260—885 |

OTHER REFERENCES

Skeist: Handbook of Adhesives; Reinhold Publishing Corp.; 1962; pp. 344, 345, 452–455. Sci. Lib. TP 986 s5.

MORRIS LIEBMAN, *Primary Examiner.*

L. T. JACOBS, *Assistant Examiner.*

UNITED STATES PATENT OFFICE
CERTIFICATE OF CORRECTION

Patent No. 3,390,115                                                June 25, 1968

Hugh J. Hagemeyer, Jr., et al.

It is certified that error appears in the above identified patent and that said Letters Patent are hereby corrected as shown below:

Column 3, Table I, lines 12 to 40, the table should appear as shown below:

TABLE I

CHEMICAL COMPOSITION AND OUTSTANDING CHARACTERISTICS OF PLASTICIZERS

| Monomeric type: | Outstanding Characteristic: |
|---|---|
| (DOP) Di-(2-ethylhexyl) phthalate | General Purpose |
| (DIOP) Di-(2-ethyl-4-methyl-pentyl) phthalate | General Purpose |
| (DCP) Di-capryl phthalate | General Purpose |
| (DIDP) Di-isodecyl phthalate | Volatility |
| Di-(2-ethylhexyl) hexahydrophthalate | General Purpose |
| Cresyl diphenyl phosphate | Volatility, flame resistance |
| (TCP) Tricresyl phosphate | Volatility, flame resistance |
| (DOA) Di-(2-ethylhexyl) adipate | Low temp. |
| (DOS) Di-(2-ethylhexyl) sebacate | Low temp. light stability |
| (DOZ) Di-(2-ethylhexyl) azelate | Low temp. |
| Monomeric epoxy (2-ethylhexyl-epoxytallate) | Heat and light stability, Low temp. |
| Triethylene glycol dicaprylate | Heat stability, high thixotropy |
| Acetyl tributyl citrate | Non-toxicity | line 68, "ployvinyl" should read -- polyvinyl --; line 74, "etser" should read -- ester --. Column 5, in the heading to the Table, second column lines 1 to 3, "2,2,4-trimethyl-1,3-pentanediolj monomethacrylate" should read -- 2,2-dimethyl-1,3-propanediol monoethacrylate --; same table in the heading, third column, lines 1 and 2, "2,2,4-trimethyl-1,3-pentanediol" should read -- 2,2-dimethyl-1,3-propanediol dimethacrylate --.

Signed and sealed this 9th day of December 1969.

(SEAL)
Attest:

EDWARD M. FLETCHER, JR.
Attesting Officer

WILLIAM E. SCHUYLER, JR.
Commissioner of Patents